US012705400B2

(12) United States Patent
Kim et al.

(10) Patent No.: US 12,705,400 B2
(45) Date of Patent: Aug. 11, 2026

(54) SYSTEM AND METHOD FOR PROVIDING CONTRACT SUPPORT SERVICE

(71) Applicants: Sung Chul Kim, Seoul (KR); Seong Eun Cho, Gyeonggi-do (KR)

(72) Inventors: Sung Chul Kim, Seoul (KR); Seong Eun Cho, Gyeonggi-do (KR)

( * ) Notice: Subject to any disclaimer, the term of this patent is extended or adjusted under 35 U.S.C. 154(b) by 112 days.

(21) Appl. No.: 18/778,536

(22) Filed: Jul. 19, 2024

(65) Prior Publication Data

US 2025/0363247 A1 Nov. 27, 2025

(30) Foreign Application Priority Data

May 23, 2024 (KR) ........................ 10-2024-0066811

(51) Int. Cl.
*G06F 21/64* (2013.01)
*G06F 21/60* (2013.01)

(52) U.S. Cl.
CPC ............ *G06F 21/64* (2013.01); *G06F 21/602* (2013.01)

(58) Field of Classification Search
CPC ............................... G06F 21/64; G06F 21/602
See application file for complete search history.

(56) References Cited

U.S. PATENT DOCUMENTS

2023/0169498 A1* 6/2023 Sado ....................... G06F 3/167 705/41
2023/0188345 A1* 6/2023 Chang ..................... G06F 21/64
(Continued)

FOREIGN PATENT DOCUMENTS

KR 10-2010-0087735 A 8/2010
KR 10-1002726 B1 12/2010

*Primary Examiner* — Theodore C Parsons
*Assistant Examiner* — Alan L Kong
(74) *Attorney, Agent, or Firm* — Intellectual Property Law Group LLP

(57) ABSTRACT

A server for providing a contract support service communicates with a plurality of contractor terminals, the InterPlanetary File System (IPFS) and a blockchain network, and manages member information for the plurality of contractor terminals. The contract support service provision server acquires audio/video contents including audio/video files in which contract-related audio/video data are stored and metadata for audio/video, in response to a request for contract support from one contractor terminal of the plurality of contractor terminals, generates contract document information corresponding to the contract-related audio/video data, generates a provisional contract content including the generated contract document information and audio/video contents, generates first link information adapted to provide access to the generated provisional contract content and second link information adapted to provide connection with a web page to receive electronic signatures of the plurality of contractor terminals as an input, and transmits the generated first link information and second link information to the plurality of contractor terminals included in the request for contract support. In addition, when a plurality of electronic signatures are input for each contracting party from the plurality of contractor terminals that have confirmed the provisional contract content, contract support service provision server generates audio/video watermarks for the contract content including the provisional contract content and the plurality of electronic signatures, adds the generated audio/video watermarks to the provisional contract content to generate a contract content for storage, encrypts the contract content for storage using an encryption key, and stores the encrypted contract content for storage in a distributed manner using the InterPlanetary File System (IPFS) and the blockchain network.

8 Claims, 9 Drawing Sheets

(56) References Cited

U.S. PATENT DOCUMENTS

| | | | | |
|---|---|---|---|---|
| 2024/0303734 | A1* | 9/2024 | Patt | G06Q 40/04 |
| 2024/0370865 | A1* | 11/2024 | Bernardi | G06Q 20/36 |
| 2025/0291909 | A1* | 9/2025 | Fortkort | G06F 21/554 |
| 2025/0292249 | A1* | 9/2025 | Gilchrist | G06F 3/0671 |

* cited by examiner

SYSTEM AND METHOD FOR PROVIDING CONTRACT SUPPORT SERVICE

CROSS REFERENCE TO RELATED APPLICATIONS

This application claims the benefit of Korean Patent Application No. 10-2024-0066811 filed on May 23, 2024, the entirety of which is incorporated by reference herein.

BACKGROUND OF THE INVENTION

1. Field of the Invention

The present invention relates to a system and method for providing a contract support service, and more particularly, to a system and method for providing an audio and video contract support service using distributed file storage and blockchain technologies, audio and video encryption technologies, as well as electronic signatures and digital signatures.

2. Description of the Related Art

In general, most of contracts refer to written contracts, and to this end, there is a social custom that the contracts should be made using papers and pencils, or a computer in the presence of an expert. Alternatively, when signing a contract on the spot, it is a common method to record contract contents in a cell phone or make a verbal contract in the presence of third-party witnesses.

In daily life, oral contracts are made more frequently than written contracts. However, since the oral contracts are not easy to prove, the written contracts have been used more officially. Electronic contract manufacturing companies which are currently operating through electronic signatures only handle the written contracts. However, when making a written contract, time and costs for documentation of the contract are required, and there are inconveniences in procedures. In addition, as tools for most of contracts made on the spot to record the contract contents, a recorder, a mobile phone, and the like have been used, but there are weaknesses in proving the contracts, such as the possibility of forgery and falsification as described above.

PRIOR ART DOCUMENT

Patent Document (Patent Document 1) Korean Patent Registration No. 10-1002726, published on Dec. 22, 2010, entitled storage maintenance system for contract document and recordings related to contract of electronic signature (Patent Document 2) Korean Patent Publication No. 10-2010-0087735, laid-open on Aug. 5, 2010, entitled mobile commerce system for generation of enforceable oral agreements

SUMMARY OF THE INVENTION

It is an object of the present invention to provide a system and method for providing an audio and video contract support service, which may increase transparency and integrity of audio and video contracts made on the spot by blocking the possibility of forgery and falsification for contract contents and increasing security of the contract contents using InterPlanetary File System (IPFS) and blockchain technologies, audio and video encryption, as well as electronic signatures and digital signatures.

To achieve the above object, according to an aspect of the present invention, there is provided a server for providing a contract support service, which connected with a plurality of contractor terminals, an InterPlanetary File System (IPFS), and a blockchain network through a network, the server including: a communication unit configured to communicate with the plurality of contractor terminals, the InterPlanetary File System (IPFS) and the blockchain network; a service management unit configured to manage member information of the plurality of contractor terminals; a contract content pre-processing unit configured to acquire audio/video contents including audio/video files in which contract-related audio/video data are stored and metadata for audio/video, in response to a request for contract support from one contractor terminal of the plurality of contractor terminals, generate contract document information corresponding to the contract-related audio/video data, generate a provisional contract content including the generated contract document information and audio/video contents, generate first link information adapted to provide access to the generated provisional contract content and second link information adapted to provide connection with a web page to receive electronic signatures of the plurality of contractor terminals as an input, and control the communication unit to transmit the generated first link information and second link information to the plurality of contractor terminals included in the request for contract support; a contract content post-processing unit configured to, when a plurality of electronic signatures are input for each contracting party from the plurality of contractor terminals that have confirmed the provisional contract content, generate audio/video watermarks for the contract content including the provisional contract content and the plurality of electronic signatures, add the generated audio/video watermarks to the provisional contract content to generate a contract content for storage, encrypt the contract content for storage using an encryption key, and control the communication unit to store the encrypted contract content for storage in a distributed manner using the InterPlanetary File System (IPFS) and the blockchain network, wherein the metadata for audio/video includes location information and storage time information of the contractor terminal in which storage of the audio/video files was performed.

The contract content pre-processing unit may control the communication unit to transmit a user input screen for inquiring whether a plurality of contracting parties perform recording audio and video using one contractor terminal at the same location or whether the plurality of contracting parties perform recording audio and video using Internet phones in order to acquire audio/video files to the first contractor terminal that has sent the request for contract support.

When receiving a user input that the plurality of contracting parties perform recording audio and video using one contractor terminal at the same location from the contractor terminal that has sent the request for contract support, the contract content pre-processing unit may receive contract-related audio and video data from the one contractor terminal to generate audio/video files, and when receiving a user input that the plurality of contracting parties perform recording audio and video using Internet phones from the contractor terminal that has sent the request for contract support, the contract content pre-processing unit may request an Internet phone channel to a VoIP server connected thereto through the network, transmit recording audio/video link information adapted to provide access to the Internet phone channel to e-mails of the plurality of contracting parties, respectively, and receive audio/video data related to the audio/video-recorded contract through the Internet phone channel to generate audio/video files.

The contract content pre-processing unit may generate contract document information using a speech to text (STT) in the audio included in the audio/video files.

The service management unit may control the communication unit to transmit an electronic signature request file for requesting confirmation of the audio/video files included in the provisional contract content to the e-mails of the plurality of contracting parties included in the member information, and for requesting electronic signatures based on the confirmation input for the audio/video files, transmit authentication numbers to the contractor terminals as a text message, and receive the transmitted authentication numbers from the contractor terminals as an input using the same screen as a screen into which the electronic signature is input, so as to additionally confirm that they are the contracting parties.

The contract content post-processing unit may receive a plurality of electronic signatures for each contracting party from the plurality of contractor terminals, as well as metadata for electronic signatures including location information and storage time information on where the electronic signatures were made, and generate a contract content for storage by further including the metadata for electronic signatures.

The contract content post-processing unit may generate an encryption key by applying a Bcrypt algorithm to a name and an e-mail domain name of the contracting party, encrypt the contract content for storage using the generated encryption key and an AES algorithm, control the communication unit to upload the encrypted contract content for storage to the InterPlanetary File System (IPFS), control the communication unit to, when an IPFS hash value is received from the InterPlanetary File System (IPFS) through the communication unit, store the received IPFS hash value in the blockchain network, and acquire a transaction ID (TxID) to obtain the IPFS hash value from the blockchain network through the communication unit and a data ID (DataID) which is information adapted to identify the IPFS hash value.

According to another aspect of the present invention, there is provided a method for providing a contract support service using a server for providing a contract support service, which connected with a plurality of contractor terminals, an InterPlanetary File System (IPFS), and a local server through a network, the method including: acquiring audio/video contents including audio/video files in which contract-related audio and video data are stored and metadata for audio/video, in response to a request for contract support from one contractor terminal of the plurality of contractor terminals; generating contract document information corresponding to the contract-related audio and video data, generating a provisional contract content including the generated contract document information and audio and video contents; generating first link information adapted to provide access to the generated provisional contract content and second link information adapted to provide connection with a web page to receive electronic signatures of the plurality of contractor terminals as an input, and transmitting the generated first link information and second link information to the plurality of contractor terminals included in the request for contract support; when a plurality of electronic signatures are input for each contracting party from the plurality of contractor terminals that have received the provisional contract content, generating audio/video watermarks for the contract content including the provisional contract content and the plurality of electronic signatures; adding the generated audio/video watermarks to the provisional contract content to generate a contract content for storage; encrypting the contract content for storage using an encryption key; and storing the encrypted contract content for storage in a distributed manner using an InterPlanetary File System (IPFS) and a blockchain network, wherein the metadata for audio/video includes location information and storage time information of the contractor terminal in which recording audio and video were performed.

According to the present invention, there are provided the system and method for providing a contract support service which may improve transparency of oral contracts by blocking the possibility of forgery and falsification for contract contents and increasing security of contract contents using InterPlanetary File System (IPFS) and blockchain technologies, such that costs and time incurred for contracts that occur in various areas of life can be reduced and the convenience of contracts can be increased.

In addition, according to the present invention, data uploaded to the blockchain, such as contents of the signed contract, such as voice, video, electronic signatures, and personal information, etc. may be stored and confirmed forever regardless of whether the company providing the contract support service operates or not, such that the security and storage stability of the contract contents can be secured and the reliability of contract confirmation data can be increased.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Hereinafter, embodiments of the present invention will be described in detail with reference to the accompanying drawings. In addition, in description of the present invention, the publicly known functions and configurations related to the present invention, which are judged to be able to make the purport of the present invention unnecessarily obscure will not be described in detail. Further, terms to be described below are defined in consideration of the functions in the present invention, and may differ depending on the intentions of a user or an operator or custom. Accordingly, such terms should be defined on the basis of the contents of the overall specification.

Figure 1:
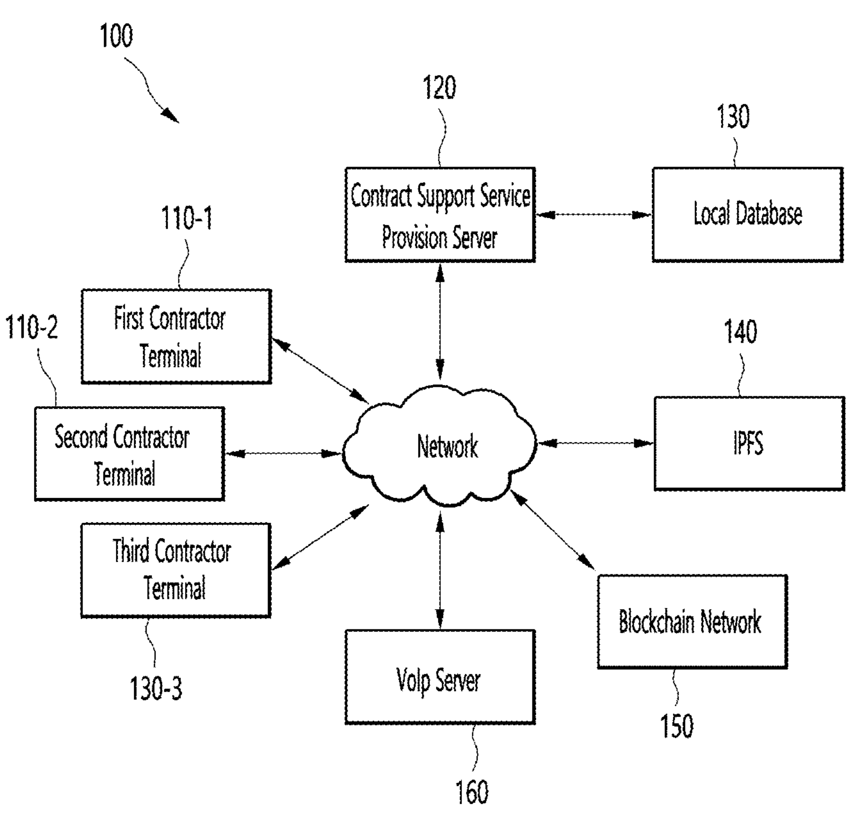
FIG. 1 is a view illustrating the configuration of a system for providing a contract support service ("contract support service provision system") according to an embodiment of the present invention.

FIG. 1 is a view illustrating the configuration of a contract support service provision system according to an embodiment of the present invention.

A contract support service provision system 100 according to an embodiment of the present invention may integrate advantages of written contracts and oral contracts in order to easily and immediately carry out processes of contracts frequently made in daily life without preparation, thereby supporting the contracts so as to change the paradigm of existing contract methods by maximizing legal proof and evidence capacities, while saving time for documentation of the contract and costs required to hire an expert, and resolving procedural inconveniences.

The contract support service provision system 100 according to an embodiment of the present invention includes a plurality of contractor terminals 110-1, 110-2 and 110-3, a contract support service provision server 120, a local database 130, an InterPlanetary File System (IPFS) 140, a blockchain network 150 and a VoIP server 160. Here, the plurality of contractor terminals 110-1, 110-2 and 110-3, the contract support service provision server 120, the local database 130, the InterPlanetary File System (IPFS) 140, the blockchain network 150 and the VoIP server 160 are connected with one another in a communication-enabled manner through a network 10. In this case, the network 10 may be various wired or wireless communication networks such as the Internet, mobile communication network, e.g., wireless LAN (WLAN), LAN, Bluetooth and the like.

The plurality of contractor terminals 110-1, 110-2 and 110-3 are a terminal in which applications ("apps") can be installed, and may include all types of wireless communication devices that guarantee portability and mobility, such as 3 G, 4 G and 5 G terminals, a smart phone, a smart pad, a tablet PC, a personal communication system (PCS), a global system for mobile communications (GSM), personal digital cellular (PDC), a wideband-code division multiple access (W-CDMA), a wireless broadband Internet (WiBro) and the like. Although three contractor terminals 110-1, 110-2 and 110-3 are shown in FIG. 1, there can be as many contractor terminals as there are contracting parties participating in the contract. Hereinafter, for the convenience of description, a first contractor terminal 110-1 will be mainly described.

For the app mounted on the first contractor terminal 110-1, an app uploaded to a public app store such as Google Play may be downloaded and installed therein by an administrator. In addition, the first contractor terminal 110-1 may directly access the contract support service provision server 120 to download and install the app.

The first contractor terminal 110-1 may run various applications such as an application for contract support that can be downloaded by accessing the contract support service provision server 120, a decryption program for confirming contract contents and the like. The first contractor terminal 110-1 includes a microphone (not shown) for receiving audio input and a camera (not shown) for receiving video input, and when the microphone (not shown) or the camera (not shown) is activated upon recording audio or video depending on the selection of a user in a process of the contract support service provided by the contract support service provision server 120, may collect contract audio/video data according to speech and contract actions of the users through the microphone (not shown) and camera (not shown), and transmit the collected date to the contract support service provision server 120. The first contractor terminal 110-1 may include a touch panel or touch screen, thus to receive information according to user input. For example, the first contractor terminal 110-1 may receive a contract name, and names and e-mails or contact information of the contracting parties. In this specification, the symbol '/' is used to briefly represent the terms, and means that the words before and after '/' are connected in parallel with conjunction 'and'.

In addition, the first contractor terminal 110-1 may be configured to measure real-time location information (e.g., GPS information) and international standard time information of the contractor terminal, and perform a metadata storage function that can add the measured real-time location record information and international standard time information to digital data generated from the first contractor terminal 110-1. The metadata may include metadata for audio/video including location information and storage time information at the time of recording audio and video in the contractor terminal related to the audio and video contract, and metadata for electronic signatures including location information and storage time information on where the electronic signatures of the contracting parties were made. The time information of audio/video data may be referred to a timestamp for audio/video, and the time information on where the electronic signatures were made may be referred to a timestamp for electronic signatures. Here, the timestamp may be timestamp information that complies with RFC 3161.

The contract support service provision server 120 may generate oral contracts using the InterPlanetary File System (IPFS) 140 and the blockchain network 150, thereby primarily eliminating the possibility of forgery and falsification of the oral contracts and improving legal evidence capacity, and secondly, may insert an audio watermark, which is a high-frequency signal in an inaudible frequency band unique to the contractor into an arbitrary time section for each contract using the watermarking technology, thereby enabling the detection of forgery and falsification due to deep fake and deep voice through AI.

The local database 130 is a data storage accessible by the contract support service provision server 120, and may be located inside the contract support service provision server 120.

The IPFS 140 is an abbreviation for the InterPlanetary File System, and is a file system for storing data in a distributed manner over a network and sharing the files between the users through the Internet. In the InterPlanetary File System (IPFS) 140, each file consists of several blocks, and each block has a unique name expressed as a hash. Each node stores only the files it is interested in, and it is possible to know who is storing which files through indexing information. To find a network file, just inquires the file name and tracks the node having the corresponding files.

Users who wish to store files in a distributed manner using the InterPlanetary File System (IPFS) 140 will upload files through the processing process provided by the InterPlanetary File System (IPFS) 140. According to the present invention, the contract support service provision server 120 uploads contract content for storage to the InterPlanetary File System (IPFS) 140, and receives an IPFS hash value corresponding to the identification information (content ID) of the contract content for storage from the InterPlanetary File System (IPFS) 140.

The blockchain network 150 may store and manage the IPFS hash value obtained from the processing process of InterPlanetary File System (IPFS) 140 in the blockchain. The blockchain refers to a data distribution processing technology that distributes and stores all data to be managed by all users participating in the network. This blockchain is a technology to prevent hacking such as forgery and falsification of transaction details, and uses a method of sending transaction details to all users participating in the transaction and comparing them with one another for each transaction to prevent data forgery. The blockchain uses decentralization beyond central control and management as a core concept. This environment enables the users to implement smart contracts that can conveniently sign a contract and modify the contract without an intermediary.

In the blockchain technology, the transaction commonly refers to an act of updating data on the blockchain. In the inventive system, transaction ID (TxID) and data ID (DataID) are generated in this process, while recording a new IPFS hash value in the blockchain-based smart contract. At this time, the IPFS hash value becomes a completely different value even if the data changes slightly, and using this principle, it is possible to inquire and identify records for transactions on the blockchain network 150. The transaction ID (TxID) and data ID (DataID) refer to information used in a self-management system to identify the IPFS hash value recorded in the blockchain network 150 and be stored in local DBs of the blockchain network 150.

According to another embodiment of the present invention, the contract support service provision server 120 may add an electronic stamp function, which is one of elements of a written contract, thereby allowing it to function as a complete contract including audio and video contracts (addition of documents through STT) and electronic signatures, as well as electronic stamp through the final results. In the case of the electronic stamp, user convenience may be improved by setting a stamp price to be automatically recommended according to the type of contract selected at the time of oral contract. In this way, the elements of the written contract may be expected to have the same effect as a written contract through electronic signatures and the confirmation process by the contractors.

The above-described method may primarily block the possibility of forgery and falsification for contract contents using the InterPlanetary File System (IPFS) 140 and the blockchain network 150, and permanently store and confirm the contents of the contract uploaded on the blockchain, such as audio, video, signatures, and personal information regardless of whether the company providing the contract support service operates or not. Next, in order to resolve the anxieties of contractors who doubt the establishment of the contract and its evidentiary capacity with only the audio and video contract without a written contract, by adding the elements of the written contract, it is possible to maximize the formality of the written contract with improved convenience. In addition, in order to maximize security considering the importance of the contract process, it is possible to add a security means that can detect and block manipulation and forgery and falsification such as deep fake of video and deep voice of audio due to recent developments in AI technology.

Figure 2:
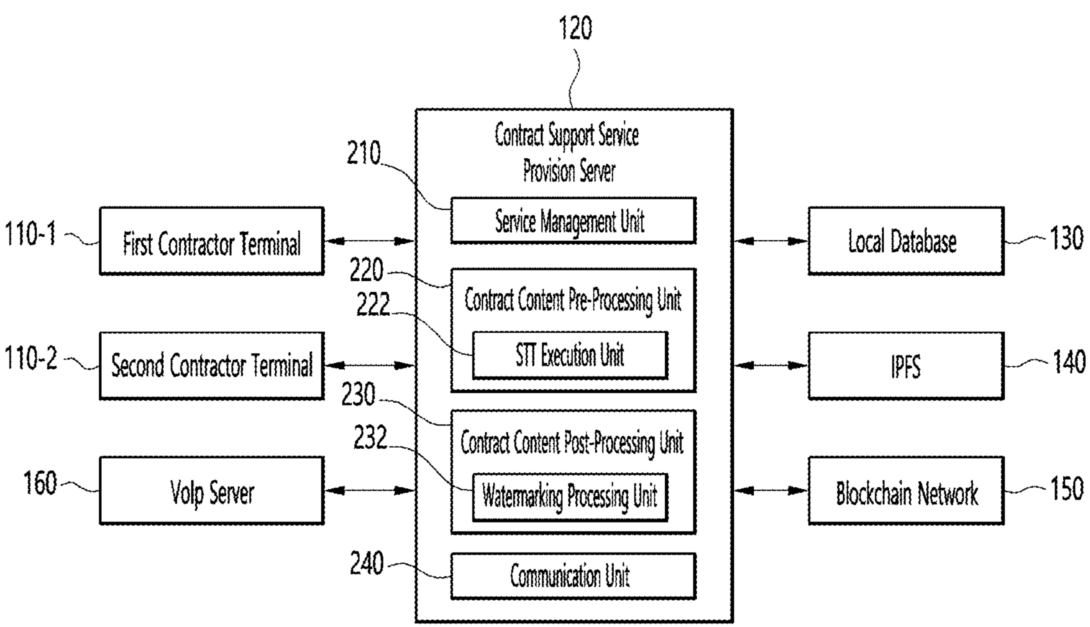
FIG. 2 is a view illustrating the configuration of a server for providing a contract support service ("contract support service provision server") of the contract support service provision system shown in FIG. 1.

FIG. 2 is a view illustrating the configuration of the contract support service provision server 120 of the contract support service provision system 100 shown in FIG. 1.

The contract support service provision server 120 may include a service management unit 210, a contract content pre-processing unit 220, a contract content post-processing unit 230 and a communication unit 240. Here, for the convenience of description, the case where the contracting parties are the user of the first contractor terminal 110-1 and the user of the second contractor terminal 110-2, and a request for contract support is received from the first contractor terminal 110-1 will be mainly described.

The service management unit 210 is configured to manage member information for a plurality of contractor terminals. The member information may include a contract name defined between the contracting parties, and names and e-mails or contact information of the contracting parties who use the service. The service management unit 210 may be configured to control overall components inside the contract support service provision server 120.

The contract content pre-processing unit 220 may acquire audio/video contents including audio/video files in which contract-related audio/video data are stored and metadata for audio/video, in response to a request for contract support from one contractor terminal 110-1 of the plurality of contractor terminals 110-1 and 110-2, generate contract document information corresponding to the contract-related audio/video data, and generate a provisional contract content including the generated contract document information and audio/video contents. The metadata for audio/video may include location information and storage time information for each of the plurality of contractor terminals 110-1 and 110-2 in which storage of the audio/video files was performed.

When a plurality of electronic signatures are input for each contracting party from the plurality of contractor terminals 110-1 and 110-2 that have received the provisional contract content, the contract content post-processing unit 230 may generate audio/video watermarks for the contract content including the provisional contract content and the plurality of electronic signatures, add the generated audio/video watermarks to the provisional contract content to generate a contract content for storage, and encrypt the contract content for storage using an encryption key. To this end, the contract content post-processing unit 230 may include a watermarking processing unit 232 configured to generate an audio/video watermark. The watermarking processing unit 232 may add a high-frequency signal in the unique inaudible frequency band in a section selected for the contracting parties using some of the audio data of the contracting parties, and add inconspicuous water mark video to specific portions of the electronic signatures of the contracting parties. In addition, the watermarking processing unit 232 performs a personal terminal confirmation procedure such as entering a number sent as a text message to personal mobile terminals in the signature input process which is the final process, thereby fundamentally blocking a generation of fake contract due to deep fake and deep voice.

The contract content post-processing unit 230 may control the communication unit 240 to store the encrypted contract content for storage in a distributed manner using the InterPlanetary File System (IPFS) 140 and the blockchain network 150. Specifically, under the control of the contract content post-processing unit 230, the communication unit 240 may upload the encrypted contract content for storage to the InterPlanetary File System (IPFS) 140, receive an IPFS hash value from the InterPlanetary File System (IPFS) 140, store the IPFS hash value in the blockchain network 150, and acquire transaction ID (TxID) and data ID (DataID) for managing the IPFS hash value from blockchain network 150.

Meanwhile, the contract content pre-processing unit 220 may control the communication unit 240 to transmit a user input screen for inquiring whether a plurality of contracting parties perform recording audio and video using one contractor terminal 110-1 or 110-2 at the same location or whether the plurality of contracting parties perform recording audio and video using Internet phones in order to acquire audio/video files to the first contractor terminal 110-1 that has sent the request for contract support.

When receiving a user input that the plurality of contracting parties perform recording audio and video using one contractor terminal at the same location from the first contractor terminal 110-1 that has sent the request for contract support, the contract content pre-processing unit 220 may receive the contract-related audio and video data sent from the first contractor terminal 110-1 to generate audio/video files. In addition, when receiving a user input that the plurality of contracting parties perform recording audio and video using the Internet phones from the first contractor terminal 110-1 that has sent the request for contract support, the contract content pre-processing unit 220 may request an Internet phone channel to the VoIP server 160 connected thereto through the network, transmit recording audio/video link information adapted to provide access to the Internet phone channel to e-mails of the plurality of contracting parties, respectively, and receive audio/video data related to the audio/video-recorded contract through the Internet phone channel to generate audio/video files.

The contract content pre-processing unit 220 may generate contract document information using a speech to text (STT) in the audio included in the audio/video files. To this end, the contract content pre-processing unit 220 may include an STT execution unit 222 configured to perform an STT algorithm, and the STT execution unit 222 may be configured to increase performance by a separate artificial intelligence service.

The service management unit 210 may control the communication unit 240 to transmit an electronic signature request file for requesting confirmation of the audio/video files included in the provisional contract content to the e-mails of the plurality of contracting parties included in the member information, and for requesting electronic signatures based on the confirmation input for the audio/video files. By adding an authentication number input field through a text message sent to personal mobile phone numbers in the signature input process which is the final process, it is possible to authenticate for the devices of the contractor terminals 110-1 and 110-2. To this end, the service management unit 210 transmits authentication numbers to the contractor terminals as a text message, and receives the transmitted authentication numbers from the contractor terminals 110-1 and 110-2 as an input using the same screen as a screen into which the electronic signature is input ("electronic signature input screen"), such that it is possible to additionally confirm that they are the contracting parties.

The contract content post-processing unit 230 may generate an encryption key by applying a Bcrypt algorithm to the name and e-mail domain name of the contracting party. Information used in the encryption key may be selectively modified. For example, the first letter in the name of the contracting party and the domain of the e-mail address may be combined and used for generation of the encryption key. Here, the Bcrypt algorithm is an algorithm designed for password hashing. Advanced Encryption Standard (AES) is a Rijndael block cipher algorithm adopted in the contest hosted by the U.S. National Institute of Standards and Technology (NIST). The size of the encryption block is 128 bits and the length of the encryption key supports 128, 192 and 256 bits. FIPS 197, AES, was established as a standard in 2001.

The contract content post-processing unit 230 may encrypt the contract content for storage using the generated encryption key and an AES algorithm. The generated encryption key cannot be viewed by others, and may be configured so that it can only be used to confirm whether the contract content for storage is original. The generated encryption key and the TxID and DataID generated in the communication unit 240 above are transmitted to the contracting parties including the first contractor terminal 110-1 as an e-mail for contract confirmation sent upon completion of the contract support service. Then, in order to read the contract content for storage by requesting form the law enforcement or personally, the name of the contracting party and the e-mail domain name should be input to access the encryption key, the TxID and DataID, and from that, the content for contract confirmation may be decrypted by combining them with the IPFS hash key in the first contractor terminal 110-1.

In addition, the contract content post-processing unit 230 also safely stores the electronic signatures using the InterPlanetary File System (IPFS) and the blockchain, and may generate a contract content for storage by further including metadata for electronic signature indicating location information and time information signed in the electronic signature video. In this way, by inserting the metadata for electronic signature, it is possible to detect forged signature videos which do not have the metadata for electronic signature or are different from the original. Further, by inserting a contract-specific watermark which is difficult to detect into the signature video, for example, by slightly adding a watermark to an edge of the image, it is possible to distinguish the original from a contract to which the forged signature is added.

Hereinafter, for the convenience of description, it is assumed that, in the contract support service provision system 100 shown in FIG. 1, a contractor terminal requesting the contract support service is the first contractor terminal 110-1, and the user of the first contractor terminal 110-1 and the user of the second contractor terminal 110-2 use the contract support service to sign a contract.

As described above, the contract support service provision system 100 may transmit the user input screen for inquiring whether a plurality of contracting parties perform recording audio and video using one contractor terminal at the same location or whether the plurality of contracting parties perform recording audio and video using Internet phones in order to acquire audio and video files to the first contractor terminal 110-1 that has sent the request for contract support. Hereinafter, FIG. 3 shows a process of performing recording audio and video by the plurality of contracting parties using one contractor terminal at the same location, and FIG. 4 shows a process of performing recording audio and video by the plurality of contracting parties using the Internet phones.

Figure 3:
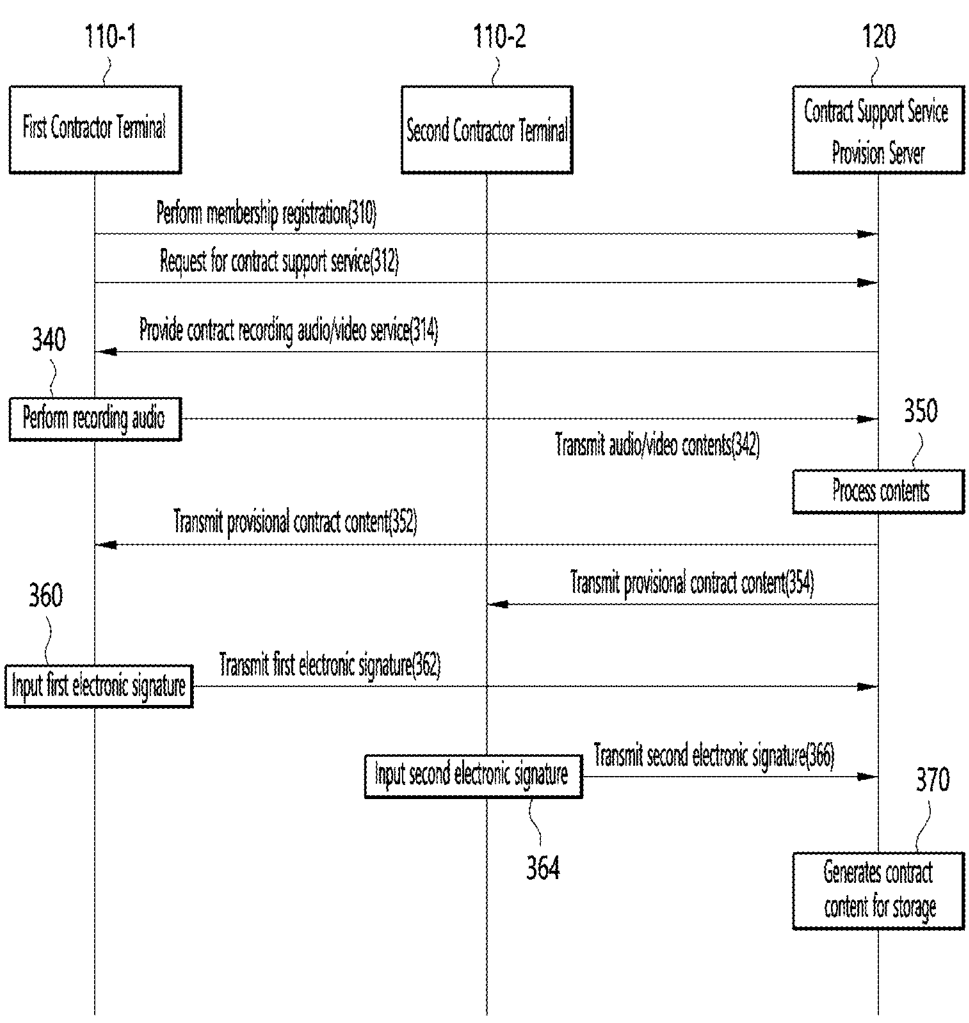
FIG. 3 is a view illustrating an example of a contract content generation process of the contract support service provision system shown in FIG. 1.
Figure 4:
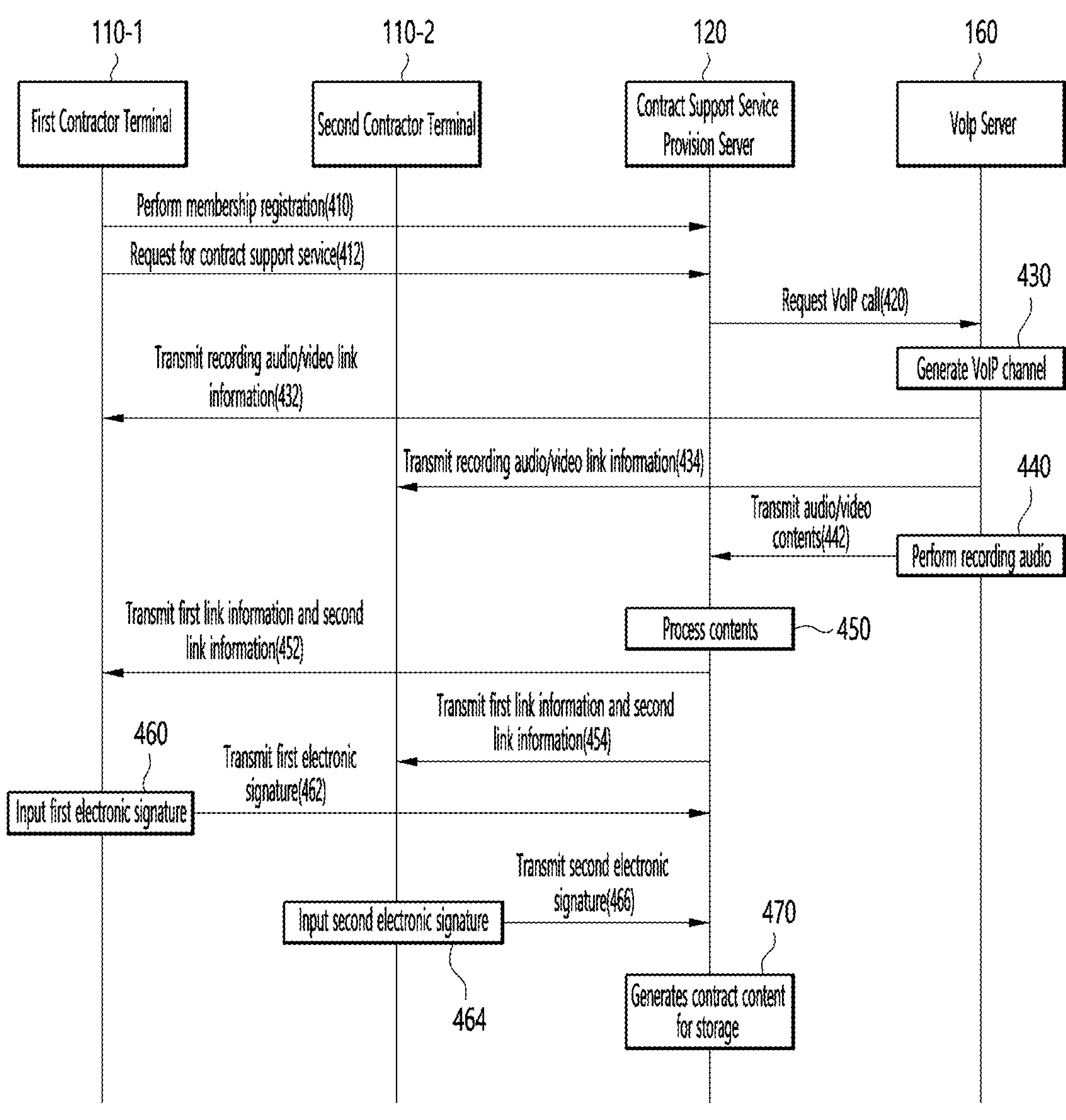
FIG. 4 is a view illustrating another example of the contract content generation process of the contract support service provision system shown in FIG. 1.

FIG. 3 is a view illustrating an example of a contract content generation process in the contract support service provision system 100 shown in FIG. 1.

In order to use the contract support service, the user of the first contractor terminal 110-1 may access the contract support service provision server 120 to perform membership registration (310). In this process, the contract support service provision server 120 may collect the name, e-mail, etc. of the user of the first contractor terminal 110-1.

When the first contractor terminal 110-1 transmits a message indicating a request for contract support service to the contract support service provision server 120 (312), the contract support service provision server 120 may provide a user screen that provides options capable of purchasing the type of contract and electronic stamp to the first contractor terminal 110-1. The contract support service provision server 120 may also provide a service that automatically recommends an electronic stamp depending on the type of the contract. Further, it may be configured in a way that the electronic stamp is confirmed in the final contract result (contract).

The contract support service provision server 120 may provide a contract recording audio and video service by collecting the name and e-mail information of the contracting party, and transmitting a user screen for performing the contract recording audio/video service to the first contractor terminal 110-1 (314).

Here, recording audio of the contract contents may be basically performed through the first contractor terminal 110-1 (340). Further, recording video of the contract contents may be additionally performed (340), and the audio/video contents generated from the first contractor terminal 110-1 are transmitted to the contract support service provision server 120 (342).

The contract support service provision server 120 processes the audio and video contents (350). Specifically, the contract support service provision server 120 acquires audio/video contents including audio/video files in which contract-related audio/video data are stored and metadata for audio/video, in response to a request for contract support from one contractor terminal of the plurality of contractor terminals, generates contract document information corresponding to the contract-related audio/video data, and generates a provisional contract content including the generated contract document information and audio/video contents (350). The contract support service provision server 120 may generate first link information adapted to provide access to the generated provisional contract content and second link information adapted to provide connection with a web page to receive electronic signatures of the plurality of contractor terminals as an input, and transmit the generated first link information and second link information to the plurality of contractor terminals included in the request for contract support (352, 354).

Then, a first electronic signature of the contracting party of the first contractor terminal 110-1 is input (360), and the first electronic signature is transmitted to the contract support service provision server 120 (362). When a second electronic signature of the contracting party of the second contractor terminal 110-2 is input (364), the second electronic signature is transmitted to the contract support service provision server 120 (366). In this way, a plurality of electronic signatures are input for each contracting party from the plurality of contractor terminals that have received and confirmed the provisional contract content. In this case, the contract support service provision server 120 may enable the users to perform personal authentication in a way of transmitting authentication numbers to the first contractor terminal 110-1 and the second contractor terminal 110-2 as a text message, respectively, adding an authentication number input area to the bottom of the electronic signature input screen of each of the first contractor terminal 110-1 and the second contractor terminal 110-2, and inputting the received authentication number into the authentication number input area.

The contract support service provision server 120 generates a contract content for storage using the provisional contract content and electronic signatures of the plurality of contracting parties (370). In this way, after recording audio of the contract in the call, the electronic signature of each contracting party is input, a contract content for storage is generated, and finally, the contract content for storage is encrypted and then stored in the InterPlanetary File System (IPFS) 140 to obtain a hash value. Then, when the hash value is stored in the blockchain network 150, and the TxID and DataID are stored in the own database, it is confirmed that the contract has been completed.

Thereby, according to the present invention, the contracting parties may complete the contract process by being able to progress to the next step only after sending the electronic signature on their own terminals. Since there are procedures of performing the electronic signature through their own terminals and inputting an authentication number that can be received as a text message, there are advantages of identifying themselves in the contract and blocking the possibility of recent deep voice and deep fake.

FIG. 4 is a view illustrating another example of the contract content generation process of the contract support service provision system shown in FIG. 1.

In order to use the contract support service, the user of the first contractor terminal 110-1 may access the contract support service provision server 120 to perform membership registration (410). In this process, the contract support service provision server 120 may collect the name, e-mail, etc. of the user of the first contractor terminal 110-1.

When transmitting a message requesting a contract support service by the first contractor terminal 110-1, if an option for multiple contractors to use the contract support service using two or more contractor terminals in different locations is selected, the contract support service provision server 120 requests the VoIP server 160 connected thereto through the network 10 to transmit an Internet phone (audio and video) (420). The VoIP server 160 transmits recording audio/video link information adapted to record audio and video by connecting the Internet phone channel to the e-mail of the contracting party of the first contractor terminal 110-1 (432), and transmits recording audio/video link information adapted to record audio and video by connecting the Internet phone channel to the e-mail of the contracting party of the second contractor terminal (434), thus to provide the Internet phone channel between the first contractor terminal 110-1 and the second contractor terminal 110-2. Then, the contracting parties may perform recording audio of the contract contents (440). In step 440, it may be set to basically perform recording audio, and additionally perform recording audio and video.

The contract support service provision server 120 processes the audio/video-recorded contract content (450). Specifically, the contract support service provision server 120 acquires audio/video contents including audio/video files in which the contract-related audio and video data are stored and metadata for audio/video, in response to a request for contract support from one contractor terminal of the plurality of contractor terminals, generates contract document information corresponding to the contract-related audio/video data, and generates a provisional contract content including the generated contract document information and audio/video contents (450). The contract support service provision server 120 may generate first link information adapted to provide access to the generated provisional contract content and second link information adapted to provide connection with a web page to receive electronic signatures of the plurality of contractor terminals as an input, and transmit the generated first link information and second link information to the plurality of contractor terminals 110-1 and 110-2 included in the request for contract support (452, 454).

Then, a first electronic signature of the contracting party of the first contractor terminal 110-1 is input (460), and the first electronic signature is transmitted to the contract support service provision server 120 (462). When a second electronic signature of the contracting party in the second contractor terminal 110-2 is input (464), the second electronic signature is transmitted to the contract support service provision server 120 (466). The electronic signature input screen is configured to progress to the next screen only when authentication information is input through a text message, so that authentication is performed on the device of the contractor terminal. Thereby, if the authentication information does not match the mobile phone of the contractor terminal, the system may make it impossible to proceed with the contract.

The contract support service provision server 120 generates a contract content for storage using the provisional contract content and electronic signatures of the plurality of contracting parties (470). In this case, the contract support service provision server 120 generates audio/video watermarks for the contract content including the provisional contract content and the plurality of electronic signatures, and adds the generated audio/video watermarks to the provisional contract content to generate a contract content for storage.

In this way, after recording audio of the contract in the call, the electronic signature of each contracting party is input, and a contract content is generated, it may be confirmed that the contract has been completed.

Figure 5:
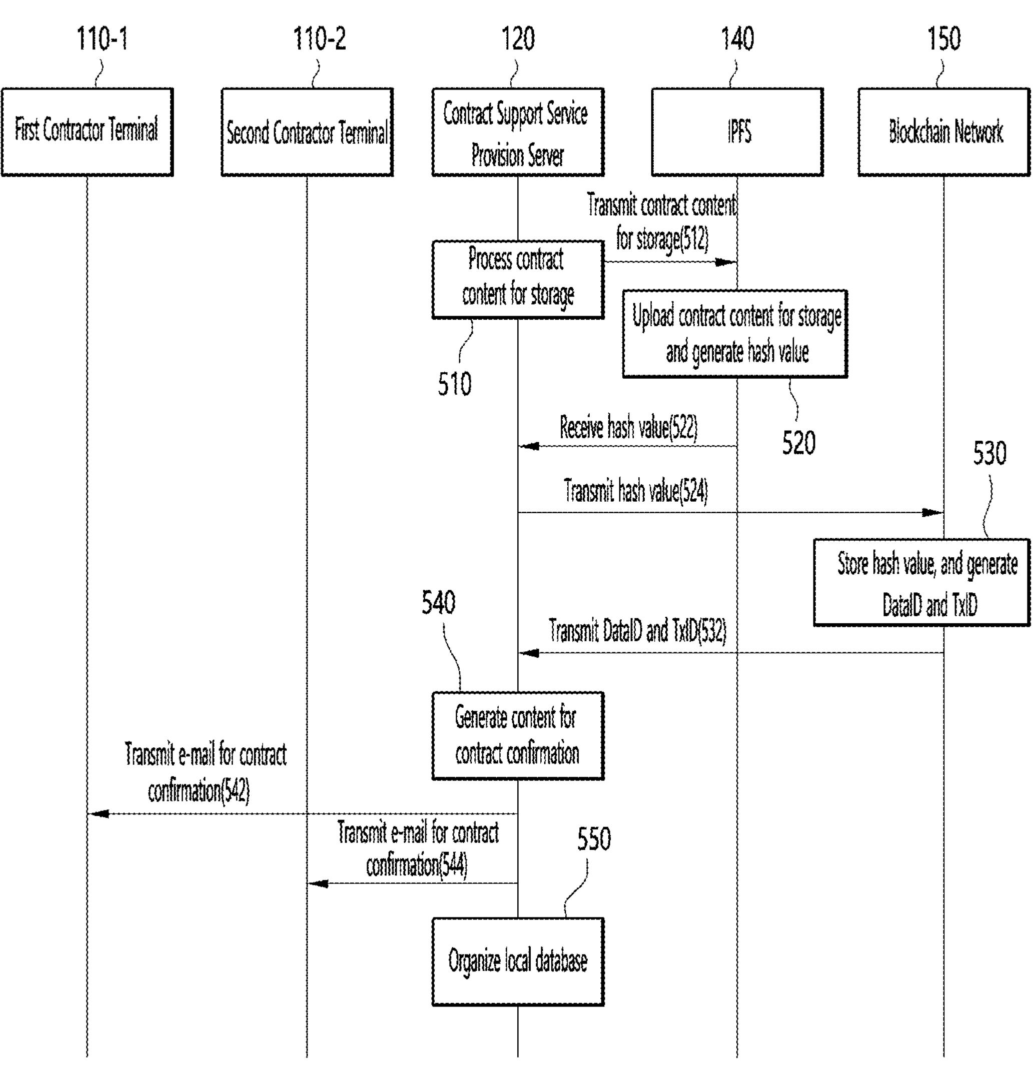
FIG. 5 is a view illustrating a contract content storage process of the contract support service provision system shown in FIG. 1 according to an embodiment of the present invention.

FIG. 5 is a view illustrating a contract content storage process of the contract support service provision system shown in FIG. 1 according to an embodiment of the present invention.

The contract support service provision server 120 performs processing to store the contract content for storage in the InterPlanetary File System (IPFS) 140 (510). To this end, the contract support service provision server 120 encrypts the contract content for storage using an encryption key, and transmits the encrypted contract content for storage to the InterPlanetary File System (IPFS) 140 (512). The contract content for storage includes contract-related audio and video data, electronic signatures, and minimal personal information of the contracting parties, and may be compressed in a Zip method.

Thereafter, the contract support service provision server 120 encrypts the compressed contract content for storage using the encryption key (generated with the name and e-mail domain name of the participant) through the Bcrypt algorithm, and stores the encrypted file in the InterPlanetary File System (IPFS) 140. Then, the management process of the InterPlanetary File System (IPFS) 140 uploads the contract content for storage and generates an IPFS hash value when the storage is completed (520). In this way, since the encrypted contract content is stored in the InterPlanetary File System (IPFS) 140 and the IPFS hash value for accessing the IPFS is stored in the system contract of the blockchain network 150, it is possible to safely store the digital documents (522, 524).

The contract support service provision server 120 receives the data ID (DataID) and transaction ID (TxID), which are keys having the IPFS hash value recorded in the smart contract previously generated on the blockchain network 150, and are capable of inquiring the IPFS hash value (530, 532).

The contract support service provision server 120 generates a content for contract confirmation including the data ID (DataID) and transaction ID (TxID), which are keys capable of inquiring the IPFS hash value, an encryption key for decrypting the encrypted contract content, and contract document information (540), and transmits an e-mail for contract confirmation including the content for contract confirmation to the contractor terminals 110-1 and 110-2 (542, 544). The e-mail for contract confirmation may include files that enable the users to confirm contract audio and video data, and access the electronic signatures, such as an encryption key generation program and decryption program. To confirm his or her contract or check the contract with the law enforcement, the user should have the e-mail used in the corresponding contract.

The contract support service provision server 120 may organize the local database 130 to prevent possibility of storage and leakage of unnecessary personal information (550). The local database 130 may be organized in a way of storing only the corresponding transaction ID (TxID) and data ID (DataID), and information for the encryption key (e.g., the first letter in the name, e-mail domain of the participant) for service management by the contract support service provision server 120, and deleting other information transmitted and received in the process of providing the contract support service.

Figure 6:
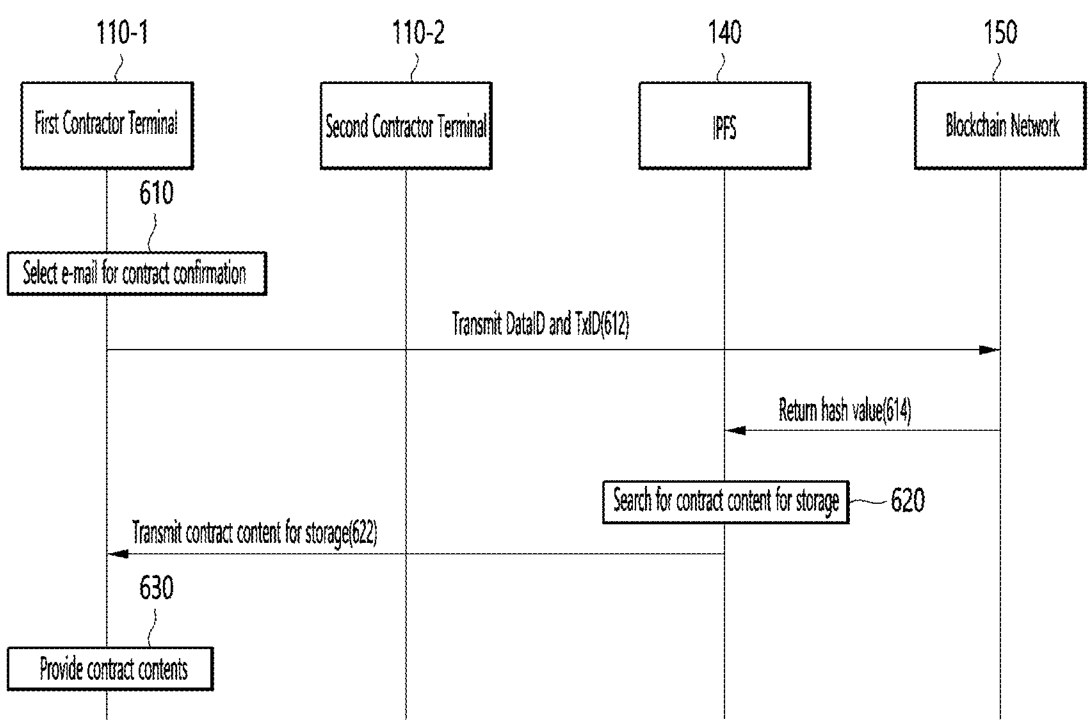
FIG. 6 is a view illustrating a contract content confirmation process of the contract support service provision system shown in FIG. 1 according to an embodiment of the present invention.

FIG. 6 is a view illustrating a contract content confirmation process of the contract support service provision system shown in FIG. 1 according to an embodiment of the present invention.

When selecting the e-mail for contract confirmation by the contracting party, who is the user of the first contractor terminal 110-1, the first contractor terminal 110-1 provides a message window requesting an input of a password (for example, a phone number of the contracting party, etc.) able to open the e-mail for contract confirmation to the user screen, and if a password matching the pre-stored password is input and inquired from the message window, it is possible to perform an operation for checking contract audio and video data and contract document information of the contracting parties.

To this end, the first contractor terminal 110-1 transmits the data ID (DataID) and transaction ID (TxID) attached to the e-mail for contract confirmation to the blockchain network 150 (612), and the blockchain 150 returns the IPFS hash value to the InterPlanetary File System (IPFS) 140 (614). Then, the InterPlanetary File System (IPFS) 140 searches for the contract content for storage using the IPFS hash value (620), and transmits it to the first contractor terminal 110-1 (622).

The first contractor terminal 110-1 may decrypt the contract content for storage encrypted with AES using the encryption key attached to the e-mail for contract confirmation, and provide the contract-related audio data and contract document information to the user (630).

In the contract-related audio data, the metadata for audio/video including location information and storage time information on where the contract-related audio and video were recorded are stored together, and in the signature image included in the contract document information, the metadata for electronic signatures including location information and storage time information on where the electronic signatures of the contracting parties were made are stored together. Further, since in the contract-related audio data, the audio watermark, which is a sound in an inaudible random frequency band capable of distinguishing customers, is stored only in the time period that can specify the customers, the possibility of duplication may be blocked. An additional method of blocking the possibility of forgery by adding a watermark to an edge portion of the signature image having letters written therein may be used.

By the above-described method, the audio and video data, the electronic signature images, the metadata including the location information and time information, and the minimal personal information, which are the results of the contract process, may be stored by compressing and encrypting them using the InterPlanetary File System (IPFS) and the blockchain, thereby maximizing the security. Further, by inserting the high-frequency signal of the contractor's unique inaudible frequency band into the unique time section of each contract using the audio watermarking technology, the portion of the verbal contract enables the detection of forgery and falsification due to recent deep fake and deep voice through AI. In addition, by using video watermarking technologies for the signature video and inserting the location and time information into metadata for audio/video, the portion of the written contract may fundamentally block the possibility of forgery and falsification. Further, additional evidence may be secured by allowing the users to listen to the contract again, and through the procedure of waiting for an electronic signature, the option to add electronic stamp, the document reinforcement through automatic generation of the contract using the audio recognition solution (STT), and the process of inputting the authentication number of the text message sent to the contractor terminal, etc.

Figure 7:
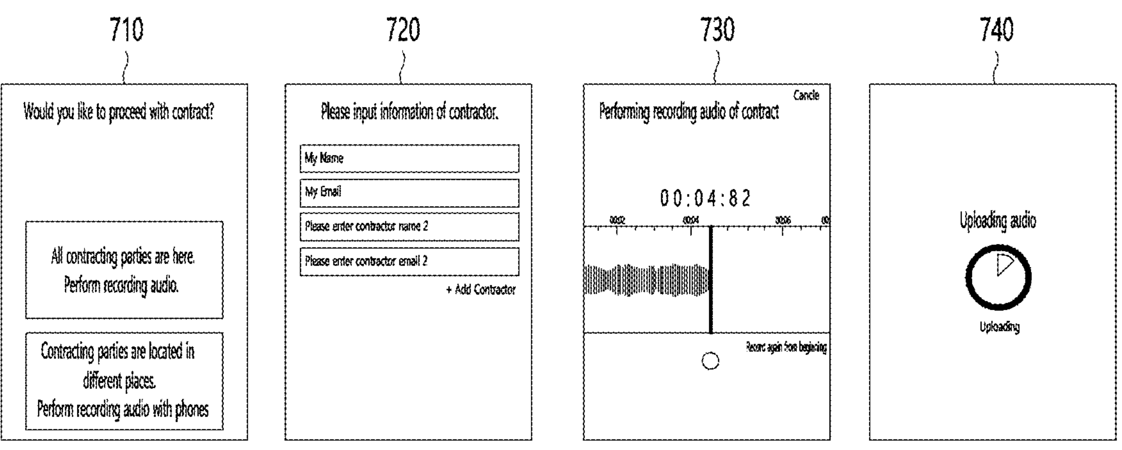
FIG. 7 is a view illustrating an example of a user interface screen provided to a contractor terminal during the contract content generation process of the contract support service provision system shown in FIG. 1 according to an embodiment of the present invention.

FIG. 7 is a view illustrating an example of a user interface screen provided to a contractor terminal during the contract content generation process of the contract support service provision system shown in FIG. 1 according to an embodiment of the present invention.

A screen 710 is an example of a user input screen in the first contractor terminal 110-1 for inquiring, by the contract content pre-processing unit 220, whether a plurality of contracting parties perform recording audio and video using one contractor terminal at the same location or whether the plurality of contracting parties perform recording audio and video using Internet phones in order to acquire audio and video files.

A screen 720 is a screen for receiving information of the plurality of contracting parties on the contract to be a target of the contract support service as an input, and may be configured to receive the input name and e-mail address of each contracting party.

A screen 730 may be provided while contract recording audio and video are performed, and a screen 740 may be provided while the contract-related audio and video data are uploaded to the contract support service provision server 120.

Figure 8:
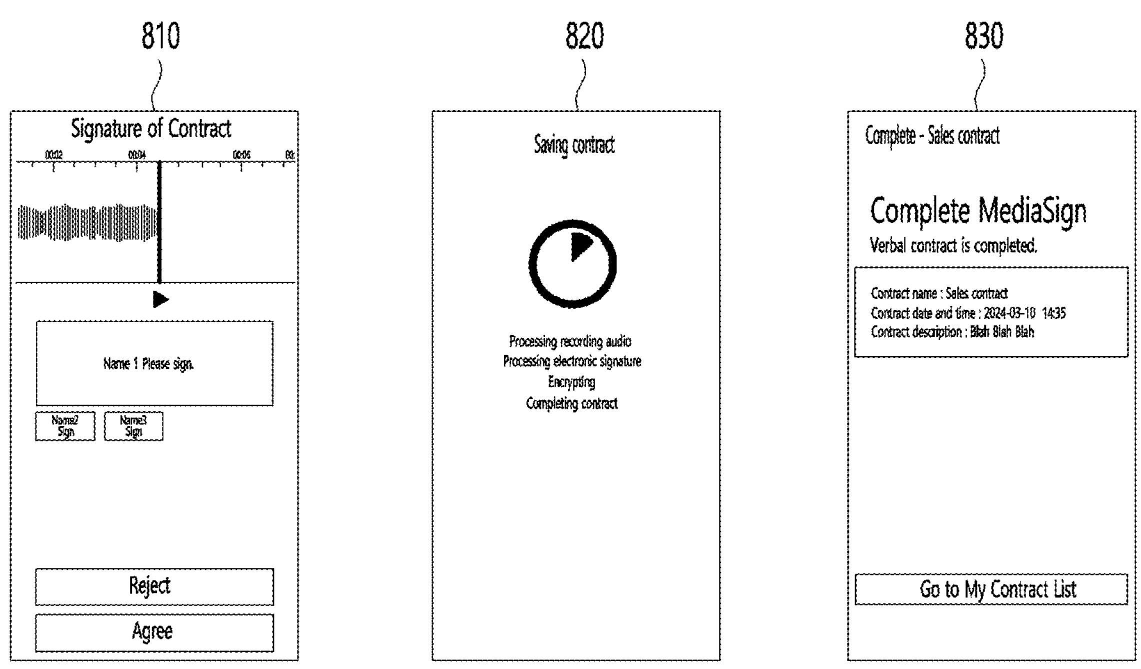
FIG. 8 is a view illustrating another example of the user interface screen provided to the contractor terminal during the contract content storage process of the contract support service provision system shown in FIG. 1 according to an embodiment of the present invention.

FIG. 8 is a view illustrating another example of the user interface screen provided to the contractor terminal during the contract content storage process of the contract support service provision system shown in FIG. 1 according to an embodiment of the present invention.

A screen 810 is a screen for receiving the electronic signature of the contracting party who is the user of the first contractor terminal 110-1 as an input. A screen 820 may be provided while the contract support service provision server 120 receives contract content, processes them, generates a contract content for storage, and stores it in a distributed manner. A screen 830 may be provided when the contract has been completed by the contract support service of the present invention.

Figure 9:
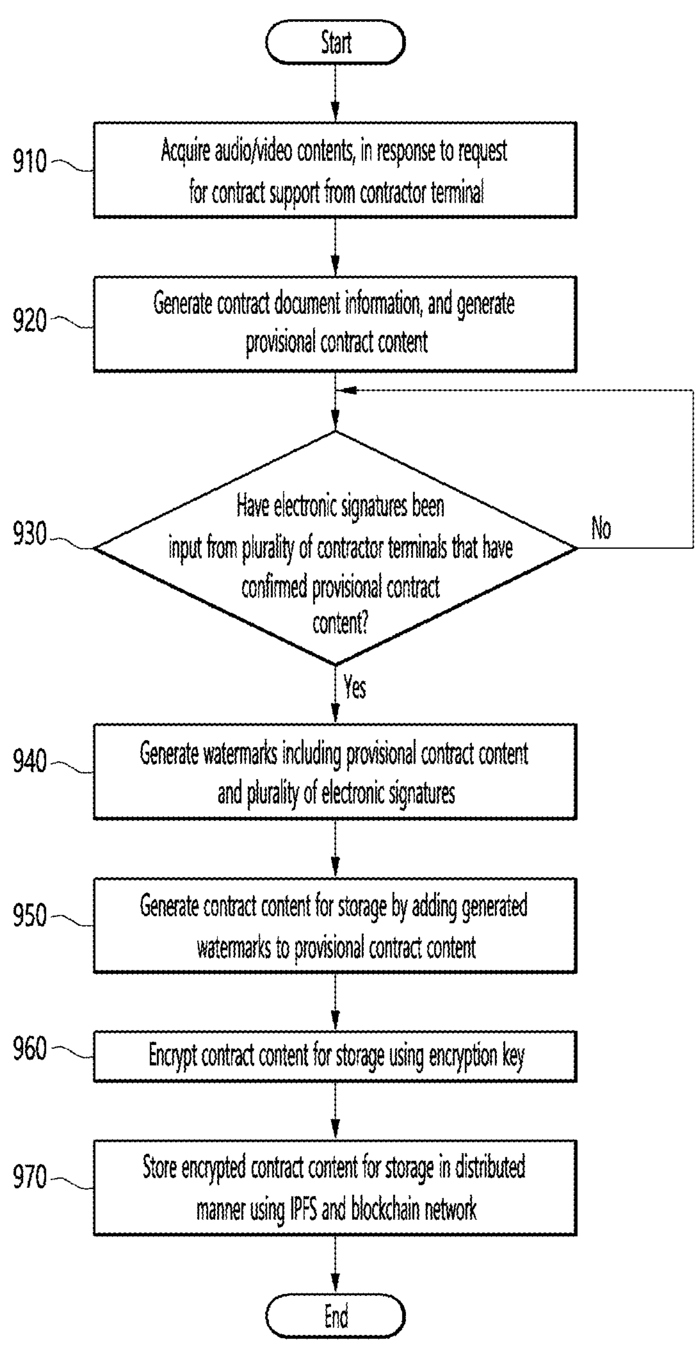
FIG. 9 is a flowchart illustrating a method for proving a contract support service using the contract support service provision server of FIG. 1.

FIG. 9 is a flowchart illustrating a method for proving a contract support service using the contract support service provision server 120 of FIG. 1.

The contract support service provision server 120 acquires audio and video contents including audio/video files in which contract-related audio and video data are stored and metadata for audio/video, in response to a request for contract support from one contractor terminal of the plurality of contractor terminals (910). The metadata for audio/video includes location information and storage time information of the contractor terminals in which recording audio and video were performed.

The contract support service provision server 120 generates contract document information corresponding to the contract-related audio and video data, and generates a provisional contract content including the generated contract document information and audio and video contents (920).

In addition, the contract support service provision server 120 may generate first link information adapted to provide access to the generated provisional contract content and second link information adapted to provide connection with a web page to receive electronic signatures of the plurality of contractor terminals as an input, and transmit the generated first link information and second link information to the plurality of contractor terminals included in the request for contract support. Accordingly, when receiving all the plurality of electronic signatures for each contracting party from the plurality of contractor terminals that have received the provisional contract content (930), the contract support service provision server 120 generates an audio watermark and a video watermark for the contract content including the provisional contract content and the plurality of electronic signatures (940). The contract support service provision server 120 may generate audio watermarks using the recorded audio and video of the contracting parties, and generate video watermarks for each electronic signature.

The contract support service provision server 120 generate a contract content for storage by adding the generated audio and video watermarks to the provisional contract content (950).

The contract support service provision server 120 encrypts the contract content for storage using an encryption key (960), and stores the encrypted contract content for storage in a distributed manner using the InterPlanetary File System (IPFS) 140 and the blockchain network 150 (970).

According to the present invention, by integrating advantages of written contracts and oral contracts in order to easily carry out processes of contracts frequently made in daily life, it is possible to change the paradigm of existing contract methods by maximizing legal proof and evidence capacities, while saving time for documentation and costs required to hire an expert, and resolving procedural inconveniences.

An aspect of the present invention may be implemented as a computer-readable code in a computer-readable recording medium. The codes and code segments, which implement the above program, may be easily deduced by a computer programmer in the art. The computer-readable recording medium may include all types of recording devices for storing data that can be read by a computer system. Examples of computer-readable recording medium may include ROM, RAM, CD-ROM, magnetic tape, floppy disk, optical disk and the like. Further, the computer-readable recording medium may be distributed over a computer system connected by a network, and written and implemented in computer-readable code that can be read by the computer in a distributed manner.

The above description is merely one embodiment of the present invention, and those skilled art to which the present invention pertains will be able to implement it in a modified form without departing from the essential characteristics of the present invention. Therefore, the protective scope of the present invention is not limited to the above-described embodiment, and should be interpreted to include various embodiments within the scope equivalent to those described in the claims.

DESCRIPTION OF REFERENCE NUMERALS

100: Contract support service provision system
110-1, 110-2, 110-3: Contractor terminal
120: Contract support service provision server
130: Local database
140: InterPlanetary File System (IPFS)
150: Blockchain network
160: VoIP server
210: Service management unit
220: Contract content pre-processing unit
230: Contract content post-processing unit
240: Communication unit

What is claimed is:

1. A server for providing a contract support service, which connected with a plurality of contractor terminals, an InterPlanetary File System (IPFS), and a blockchain network through a network, the server comprising:

a communication unit configured to communicate with the plurality of contractor terminals, the InterPlanetary File System (IPFS) and the blockchain network;

a service management unit configured to manage member information of the plurality of contractor terminals;

a contract content pre-processing unit configured to acquire audio/video contents including audio/video files in which contract-related audio/video data are stored and metadata for audio/video, in response to a request for contract support from one contractor terminal of the plurality of contractor terminals, generate contract document information corresponding to the contract-related audio/video data, generate a provisional contract content including the generated contract document information and audio/video contents, generate first link information adapted to provide access to the generated provisional contract content and second link information adapted to provide connection with a web page to receive electronic signatures of the plurality of contractor terminals as an input, and control the communication unit to transmit the generated first link information and second link information to the plurality of contractor terminals included in the request for contract support;

a contract content post-processing unit configured to, when a plurality of electronic signatures are input for each contracting party from the plurality of contractor terminals that have confirmed the provisional contract content, generate audio/video watermarks for the contract content including the provisional contract content and the plurality of electronic signatures, add the generated audio/video watermarks to the provisional contract content to generate a contract content for storage, encrypt the contract content for storage using an encryption key, and control the communication unit to store the encrypted contract content for storage in a distributed manner using the InterPlanetary File System (IPFS) and the blockchain network, wherein the metadata for audio/video includes location information and storage time information of the contractor terminal in which storage of the audio/video files was performed.

2. The server according to claim 1, wherein the contract content pre-processing unit controls the communication unit to transmit a user input screen for inquiring whether a plurality of contracting parties perform recording audio and video using one contractor terminal at the same location or whether the plurality of contracting parties perform recording audio and video using Internet phones in order to acquire audio/video files to the first contractor terminal that has sent the request for contract support.

3. The server according to claim 2, wherein, when receiving a user input that the plurality of contracting parties perform recording audio and video using one contractor terminal at the same location from the contractor terminal that has sent the request for contract support, the contract content pre-processing unit receives contract-related audio and video data from the one contractor terminal to generate audio/video files, and when receiving a user input that the plurality of contracting parties perform recording audio and video using Internet phones from the contractor terminal that has sent the request for contract support, the contract content pre-processing unit requests an Internet phone channel to a VoIP server connected thereto through the network, transmits recording audio/video link information adapted to provide access to the Internet phone channel to e-mails of the plurality of contracting parties, respectively, and receives audio/video data related to the audio/video-recorded contract through the Internet phone channel to generate audio/video files.

4. The server according to claim 1, wherein the contract content pre-processing unit generates contract document information using a speech to text (STT) in the audio included in the audio/video files.

5. The server according to claim 1, wherein the service management unit controls the communication unit to transmit an electronic signature request file for requesting confirmation of the audio/video files included in the provisional contract content to the e-mails of the plurality of contracting parties included in the member information, and for requesting electronic signatures based on the confirmation input for the audio/video files, transmit authentication numbers to the contractor terminals as a text message, and receive the transmitted authentication numbers from the contractor terminals as an input using the same screen as a screen into which the electronic signature is input, so as to additionally confirm that they are the contracting parties.

6. The server according to claim 5, wherein the contract content post-processing unit receives a plurality of electronic signatures for each contracting party from the plurality of contractor terminals, as well as metadata for electronic signatures including location information and storage time information on where the electronic signatures were made, and generates a contract content for storage by further including the metadata for electronic signatures.

7. The server according to claim 1, wherein the contract content post-processing unit generates an encryption key by applying a Bcrypt algorithm to a name and an e-mail domain name of the contracting party, encrypts the contract content for storage using the generated encryption key and an AES algorithm, controls the communication unit to upload the encrypted contract content for storage to the InterPlanetary File System (IPFS), controls the communication unit to, when an IPFS hash value is received from the InterPlanetary File System (IPFS) through the communication unit, store the received IPFS hash value in the blockchain network, and acquires a transaction ID (TxID) to obtain the IPFS hash value from the blockchain network through the communication unit and a data ID (DataID) which is information adapted to identify the IPFS hash value.

8. A method for providing a contract support service using a server for providing a contract support service, which connected with a plurality of contractor terminals, an InterPlanetary File System (IPFS), and a local database through a network, the method comprising:

acquiring audio/video contents including audio/video files in which contract-related audio and video data are stored and metadata for audio/video, in response to a request for contract support from one contractor terminal of the plurality of contractor terminals;

generating contract document information corresponding to the contract-related audio and video data, generating a provisional contract content including the generated contract document information and audio and video contents;

generating first link information adapted to provide access to the generated provisional contract content and second link information adapted to provide connection with a web page to receive electronic signatures of the plurality of contractor terminals as an input, and transmitting the generated first link information and second link information to the plurality of contractor terminals included in the request for contract support;

when a plurality of electronic signatures are input for each contracting party from the plurality of contractor terminals that have received the provisional contract content, generating audio/video watermarks for the contract content including the provisional contract content and the plurality of electronic signatures;

adding the generated audio/video watermarks to the provisional contract content to generate a contract content for storage;

encrypting the contract content for storage using an encryption key; and storing the encrypted contract content for storage in a distributed manner using an InterPlanetary File System (IPFS) and a blockchain network, wherein the metadata for audio/video includes location information and storage time information of the contractor terminal in which recording audio and video were performed.

* * * * *